United States Patent
Lin et al.

(10) Patent No.: US 11,468,712 B2
(45) Date of Patent: Oct. 11, 2022

(54) LIVENESS DETECTION APPARATUS, SYSTEM AND METHOD

(71) Applicant: AuthenX Inc., Zhubei (TW)

(72) Inventors: Sheng-fu Lin, Zhubei (TW); Chiu-lin Yu, Zhubei (TW); Kai-lun Han, Zhubei (TW); Jenq-yang Chang, Zhubei (TW); Mao-jen Wu, Zhubei (TW)

(73) Assignee: AuthenX Inc., Zhubei (TW)

( * ) Notice: Subject to any disclaimer, the term of this patent is extended or adjusted under 35 U.S.C. 154(b) by 22 days.

(21) Appl. No.: 17/133,703

(22) Filed: Dec. 24, 2020

(65) Prior Publication Data

US 2021/0216800 A1    Jul. 15, 2021

Related U.S. Application Data

(60) Provisional application No. 62/959,128, filed on Jan. 9, 2020.

(51) Int. Cl.
| | |
|---|---|
| *G06V 40/40* | (2022.01) |
| *G06K 9/62* | (2022.01) |
| *G06V 10/141* | (2022.01) |
| *G06V 10/46* | (2022.01) |

(52) U.S. Cl.
CPC ......... *G06V 40/45* (2022.01); *G06K 9/6215* (2013.01); *G06V 10/141* (2022.01); *G06V 10/462* (2022.01)

(58) Field of Classification Search
CPC .... G06V 40/45; G06V 10/141; G06V 10/462; G06K 9/6215
See application file for complete search history.

(56) References Cited

U.S. PATENT DOCUMENTS

| | | |
|---|---|---|
| 6,795,569 B1 | 9/2004 | Setlak et al. |
| 8,588,478 B2 | 11/2013 | Makimoto et al. |
| 9,633,269 B2 | 4/2017 | Gu et al. |
| 9,940,710 B2 | 4/2018 | Watanabe |
| 9,971,948 B1 | 5/2018 | Herrington et al. |
| 10,445,556 B2 | 10/2019 | Vilenskii et al. |

(Continued)

FOREIGN PATENT DOCUMENTS

| | | | | |
|---|---|---|---|---|
| CN | 107958178 A | * | 4/2018 | ......... G06K 9/00255 |
| WO | 2019038128 A1 | | 2/2019 | |

*Primary Examiner* — Bobbak Safaipour
*Assistant Examiner* — Wassim Mahrouka

(57) ABSTRACT

A liveness detection device comprising a light source unit, image sensor unit, and data processing module and authentication method thereof are provided. The light source unit comprises a substrate having a first inclined surface, whereby emitted light is reflected light from the first inclined surface. An application triggers an authentication process, which is indicated to a user. The light source unit begins illumination having a specific pattern and for a specific period and image signals are generated. Liveness detection signals are generated, via calculation of interference patterns, each, from more than one image signal, in sequence, for determination of liveness. When a liveness threshold is met, feature recognition data is generated, via calculation of interference patterns, each, from more than one image signal, in sequence, for matching. Then, the features are compared with previously enrolled data for locking or unlocking of the liveness detection device and/or system coupled thereto.

20 Claims, 16 Drawing Sheets

(56) References Cited

U.S. PATENT DOCUMENTS

| | | |
|---|---|---|
| 10,719,692 B2 | 7/2020 | Kalscheur et al. |
| 2014/0191276 A1* | 7/2014 | Kim .................. H01L 33/48 |
| | | 257/99 |
| 2018/0032826 A1* | 2/2018 | Chao .................. H04N 5/33 |
| 2018/0165512 A1* | 6/2018 | Fan .................. G06V 10/145 |
| 2019/0080153 A1 | 3/2019 | Kalscheur et al. |
| 2021/0042547 A1* | 2/2021 | Engelen ............. G06V 40/19 |

* cited by examiner

LIVENESS DETECTION APPARATUS, SYSTEM AND METHOD

RELATED APPLICATIONS

This patent claims priority to U.S. provisional patent application No. 62/959,128 to Lin et al., entitled "LIVENESS DETECTION APPARATUS, SYSTEM AND METHOD", filed Jan. 9, 2020, of which is incorporated herein by reference in its entirety.

TECHNICAL FIELD

Embodiments described herein relate generally to the field of biometric liveness detection and spoof detection and, more particularly, to liveness detection modules, devices, systems and methods for liveness and spoof detection in images captured by a camera on a device.

BACKGROUND

Biometrics uses an individual's unique biological identifiers to verify his or her identity. Some advantages of biometric authentication systems include enhanced security and the inability of a biological identifier to be forgotten or lost. However, biometric authentication is susceptible to "presentation attacks" such as spoofing, that attempts to defeat a biometric verification or identification process. The execution of the presentation attack will vary based on the biometric modality; that is, whether the biometric technique uses fingerprints, face, iris, voice, or keystroke biometrics.

Some modalities are harder to spoof than others. Furthermore, fraudsters will use different spoofing techniques for each modality. Therefore, the mechanisms required to detect spoofs and other presentation attacks must also be specifically designed for the modality.

Liveness detection is useful not only for authentication but also for identity proofing. Biometric authentication involves verification that a user is a systems authorized user. Biometric identity proofing may be performed as part of an onboarding process to verify that the authorized user is in fact a real person.

Liveness detection is any technique used to detect a spoof attempt by determining whether the source of a biometric sample is a live human being or a fake representation. This is accomplished through algorithms that analyze data collected from biometric sensors to determine whether the source is live or reproduced.

There are two main categories of liveness detection: active and passive. For active liveness detection, authorized users perform an action that cannot be easily replicated with a spoof. It might also incorporate multiple modalities, such as keystroke analysis or speaker recognition. The latter may analyze the movement of a mouth to determine liveness. For passive liveness detection, algorithms are used to detect indicators of a non-live image without user interaction. The capture of high-quality biometric data during registration improves the performance of matching and liveness detection algorithms. Nevertheless, "presentation attacks" such as spoofing continue to be a challenge for biometric authentication. As an example, for the biometric technique using a face of a user, a fraudster may use a "mask" created by a 3D printer for spoofing. As another example, for the biometric technique using a finger of a user, a fraudster may use a fake fingerprint created out of silicone for spoofing.

SUMMARY

In an embodiment, an image capturing system, comprising a main substrate, light source unit, image sensor unit and data processing module is provided. The light source unit is electrically connected to the main substrate and has a laser unit and a first optical module. The laser unit is configured to emit light having output power of over 20 mW and the first optical module is configured to transmit the emitted light of the light source unit therethrough. The image sensor unit is electrically connected to the main substrate near to the light source unit and has a second optical module and an image sensor module. The second optical module is configured to capture images therethrough. The image sensor module is configured to generate image signals of the captured images. The data processing module is electrically connected to the main substrate near to the light source and image sensor units and configured to generate liveness detection signals of the generated image signals of the captured images. The laser unit comprises a substrate having a lateral surface and a first inclined surface, a conductive layer formed over the lateral and first inclined surfaces, and a laser source. The laser source is electrically connected to the conductive layer formed over the lateral surface. The emitted light of the light source unit through the first optical module is reflected light from the conductive layer formed over the first inclined surface.

In some embodiments, the inclined surface comprises an internal angle $\theta$ from a plane of the lateral surface to the first inclined surface of between 25° to 75° degrees, inclusive.

The internal angle, provides design flexibility for the disposition of the emitted light of the light source unit through the first optical module of an image capturing system; as, a same emitted target area may be achieved via different dispositions of the light source unit within the image capturing system via variation of the internal angle and perpendicular sidewise tilt of the internal angle plane.

In some embodiments, the conductive layer comprises at least one of Au, Ag, Cu, Ni, Ti, and W, or any combination of the foregoing, providing design flexibility for conductivity and reflectivity of the conductive layer.

The conductive layer formed over the lateral and first inclined surfaces, decreases absorption of the emitted light of the light source unit when being reflected therefrom. Additionally, the conductive layer provides heat conduction for the laser source electrically connected to the conductive layer and coupling of circuitry of the image capturing system to the laser source.

In the embodiments, the data processing module is configured to generate each liveness detection signal from more than one image signal, in sequence, wherein each sequential image signal comprises a different image signal.

The generation of liveness detection data from each liveness detection signal of more than one image signal, in sequence, wherein each sequential image signal comprises a different image signal, increases the signal-to-noise ratio and reduces ambient light detection of the image capturing system via adjusting of the on/off state of the laser source and timing of the generation of image signals of the captured images, following processing of a predetermined amount of each liveness detection signal.

In the embodiments, the data processing module is configured to generate feature recognition data from more than one image signal, in sequence, wherein each sequential image signal comprises a different image signal.

The generation of feature recognition data from more than one image signal, in sequence, wherein each sequential image signal comprises a different image signal, increases the signal-to-noise ratio and reduces ambient light detection of the image capturing system via adjusting of the on/off state of the laser source and timing of the generation of image signals of the captured images, following processing of a predetermined amount of each image signal.

In some embodiments, the laser unit is an edge emitting laser unit having a coherence length of less than 30 centimeters.

An edge emitting laser provides flexibility for high output power from a single emitter and longer coherence length. High output power provides greater contrast of liveness and ambient environment for liveness detection and feature recognition. The edge emitting laser, electrically connected to the conductive layer formed over the lateral surface, together with the internal angle, decreases thickness required of the light source unit of the image capturing system.

In some embodiments, the image sensor module comprises at least one of a complementary metal oxide semiconductor (CMOS) arrays, charged coupled device (CDD) arrays or photodiode (PD) arrays.

In an embodiment, an image capturing device, comprising an image capturing system and a display is provided. The image capturing system of the image capturing device comprises a main substrate, light source unit, image sensor unit and data processing module. The light source unit is electrically connected to the main substrate and has a laser unit and a first optical module. The laser unit is configured to emit light having output power of over 20 mW and the first optical module is configured to transmit the emitted light of the light source unit therethrough. The image sensor unit is electrically connected to the main substrate near to the light source unit and has a second optical module and an image sensor module. The second optical module is configured to capture images therethrough. The image sensor module is configured to generate image signals of the captured images. The data processing module is electrically connected to the main substrate near to the light source and image sensor units and configured to generate liveness detection signals and feature recognition data of the generated image signals of the captured images. The laser unit comprises a substrate having a lateral surface and a first inclined surface, a conductive layer formed over the lateral and first inclined surfaces, and a laser source. The laser source is electrically connected to the conductive layer formed over the lateral surface. The emitted light of the light source unit through the first optical module is reflected light from the conductive layer formed over the first inclined surface.

In some embodiments, the inclined surface of the image capturing system of the image capturing device comprises an internal angle θ from a plane of the lateral surface to the first inclined surface of between 25° to 75° degrees, inclusive.

In some embodiments, the conductive layer of the image capturing system of the image capturing device comprises at least one of Au, Ag, Cu, Ni, Ti, and W, or any combination of the foregoing.

In the embodiments, the data processing module of the image capturing system of the image capturing device is configured to generate each liveness detection signal from more than one image signal, in sequence, wherein each sequential image signal comprises a different image signal.

In the embodiments, the data processing module of the image capturing system of the image capturing device is configured to generate feature recognition data from more than one image signal, in sequence, wherein each sequential image signal comprises a different image signal.

In some embodiments, the laser unit of the image capturing system of the image capturing device is an edge emitting laser unit having a coherence length of less than 30 centimeters.

In some embodiments, the image sensor module of the image capturing system of the image capturing device comprises at least one of a complementary metal oxide semiconductor (CMOS) arrays, charged coupled device (CDD) arrays or photodiode (PD) arrays.

In an embodiment, a method for capturing images via an image capturing device, comprising capturing and generating image signals, generating liveness detection signals of the image signals, generating liveness detection data and a liveness score, and determining whether the liveness score is above a liveness threshold for authenticating a user or locking the image capturing device is provided. The method for capturing images comprises emitting, via a light source unit, light having output power of over 20 mW through a first optical path to an image and capturing, via an image sensor unit, image signals through a second optical path to an image sensor module. Indicating, via the image capturing device, that the captured images of the image sensor unit are to be generated. Image signals of the captured images are generated, via an image sensor module of the image sensor unit. The image signals of the captured images are processed, via a data processing module, and liveness detection signals are generated. The liveness detection signals are processed, via the data processing module, and liveness detection data is generated. A liveness score by comparing the liveness detection data against a database is generated. Whether the liveness score is above a liveness threshold is determined, via the data processing module. If yes, a user is authenticated to use the image capturing device or the image signals are further processed. If no, the image capturing device is locked.

A laser unit of the light source unit of the image capturing device of the method for capturing images emits light having output power of over 20 mW through a first optical path to the image. The laser unit of the image capturing device of the method for capturing images comprises a substrate having a lateral surface and a first inclined surface, a conductive layer formed over the lateral and first inclined surfaces, and a laser source. The emitted light through the first optical path to the image is reflected light from the conductive layer formed over the first inclined surface.

In some embodiments of the method for capturing images, the first inclined surface comprises an internal angle θ from a plane of the lateral surface to the first inclined surface of between 25° to 75° degrees, inclusive.

In some embodiments of the method for capturing images, the conductive layer of the image capturing system of the image capturing device, comprises at least one of Au, Ag, Cu, Ni, Ti, and W, or any combination of the foregoing.

In some embodiments of the method for capturing images, generating liveness detection signals comprises generating each liveness detection signal from more than one image signal, in sequence, wherein each sequential image signal comprises a different image signal.

In some embodiments of the method for capturing images, further processing the image signals when determining whether the liveness score is above a liveness threshold, if yes, of the method, further comprises generating feature recognition data and a matching score, and determining whether the matching score is above an unlock threshold for authenticating a user or locking the image capturing device. Feature recognition data is generated and a matching score by comparing the feature recognition data against a database is generated via the data processing module. The matching score is compared to a unlock threshold of the image capturing device via the data processing module. Whether the matching score is above an unlock threshold is determined. If yes, a user is authenticated to use the image capturing device. If no, the image capturing device is locked.

In certain embodiments of the method for capturing images, generating feature recognition data of the method for capturing images comprises generating feature recognition data from more than one image signal, in sequence, wherein each sequential image signal comprises a different image signal.

In some embodiments of the method for capturing images, the laser unit is an edge emitting laser unit having a coherence length of less than 30 centimeters.

In some embodiments of the method for capturing images, the image sensor module comprises at least one of a complementary metal oxide semiconductor (CMOS) arrays, charged coupled device (CDD) arrays or photodiode (PD) arrays.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of optical communications incorporating aspects of the presently disclosed principles are illustrated by way of example, and not by way of limitation.

DETAILED DESCRIPTION

The following describes various principles related to biometric liveness detection and spoof detection by way of reference to specific examples of liveness detection and feature recognition, and liveness detection systems, devices and methods thereof, including arrangements and examples of imaging modules, image capturing systems, and image capturing devices embodying innovative concepts. More particularly, but not exclusively, such innovative principles are described as selected examples of image sensor units, light source units, and data processing modules, and liveness detection and feature recognition methods and well-known functions or constructions or methods are not described in detail for purposes of succinctness and clarity. Nonetheless, one or more of the disclosed principles may be incorporated in various other embodiments of image sensor units, light source units, and data processing modules, and liveness detection and feature recognition methods to achieve any of a variety of desired outcomes, characteristics, and/or performance criteria.

Thus, image sensor units, light source units, and data processing modules, and liveness detection and feature recognition methods having attributes that are different from those specific examples discussed herein may embody one or more of the innovative principles, and may be used in applications not described herein in detail. Accordingly, embodiments of image sensor units, light source units, and data processing modules, and liveness detection and feature recognition methods not described herein in detail also fall within the scope of this disclosure, as will be appreciated by those of ordinary skill in the relevant art following a review of this disclosure.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc.

Example embodiments as disclosed herein contemplate that entities or users may selectively block the use of, or access to, entity data or personal information data, respectively. That is, hardware and/or software elements can be provided to prevent or block access to such entity data or personal information data, respectively.

Figure 1A:
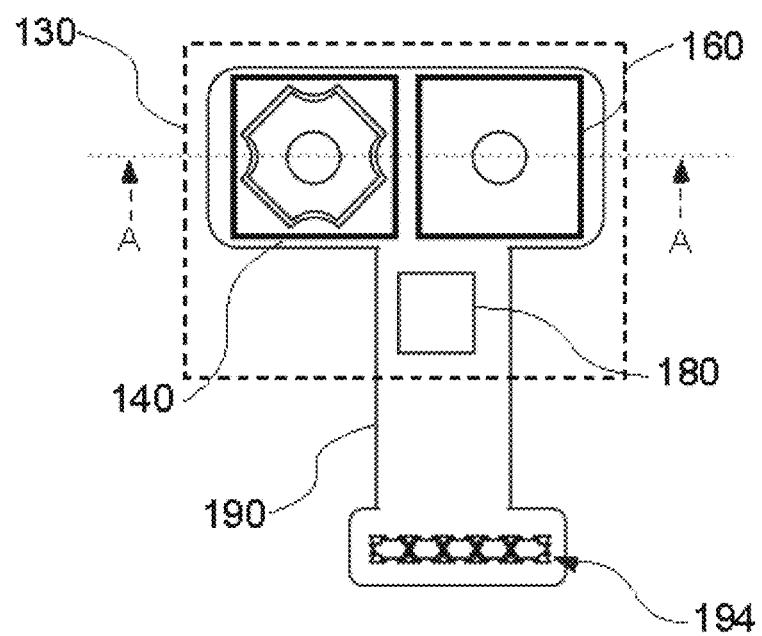
FIG. 1A depicts a representation of an embodiment of a module including an integrated circuit.
Figure 1B:
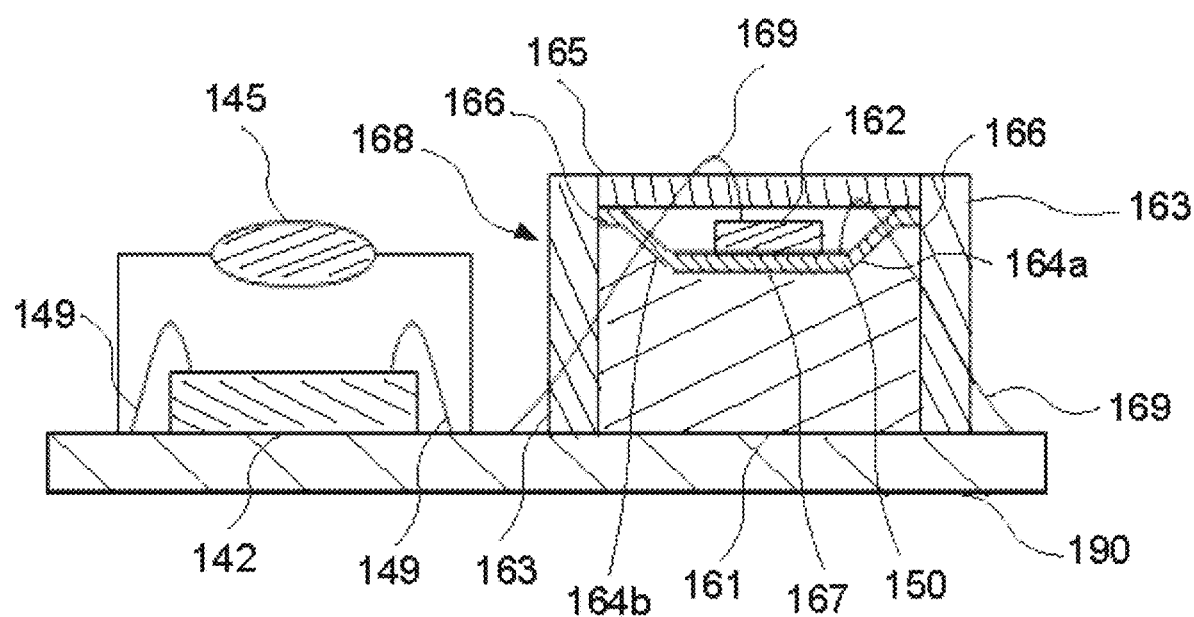
FIG. 1B depicts a cross-sectional view of the embodiment of a module including an integrated circuit through line A-A of the module of FIG. 1A.
Figure 2:
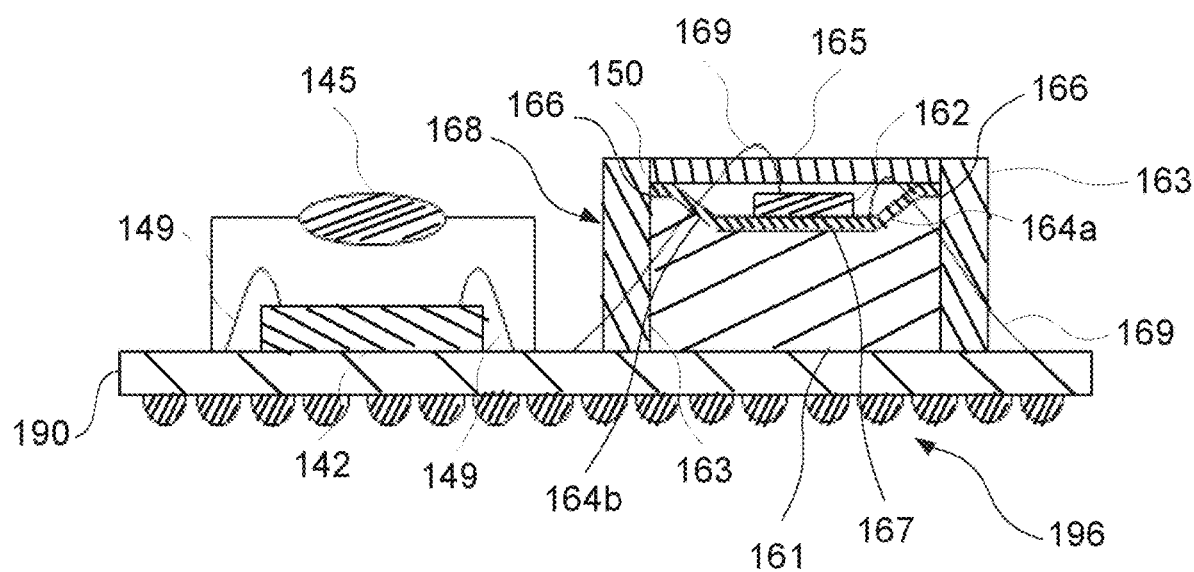
FIG. 2 depicts a partial cross-sectional view of an alternative embodiment of a module including an integrated circuit of the module of the alternative embodiment.
Figure 3:
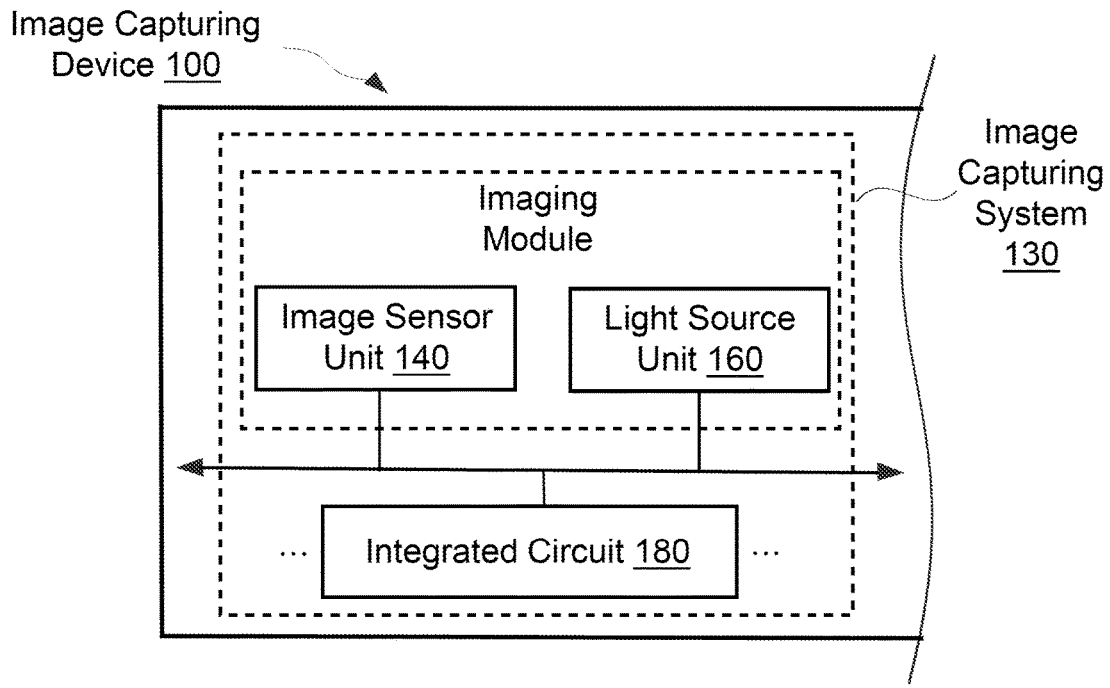
FIG. 3 depicts a partial representation of an image capturing device with an embodiment of a module including an integrated circuit.
Figure 4:
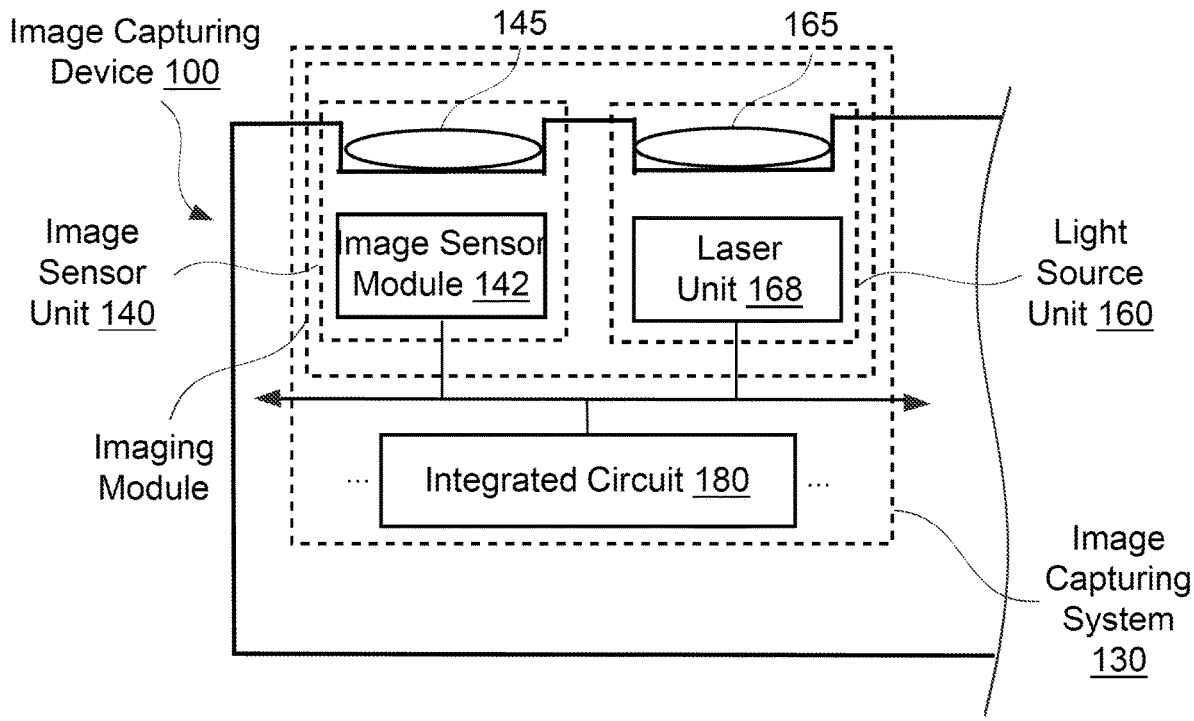
FIG. 4 depicts a partial representation of an alternative image capturing device with components of an embodiment of a module including an integrated circuit.

In an embodiment, an image capturing system 130, comprising a main substrate 190, light source unit 160, image sensor unit 140 and data processing module 180 is provided. FIG. 1A depicts a representation of an embodiment of a module including an integrated circuit. FIG. 1B depicts a cross-sectional view of the embodiment of a module including an integrated circuit through line A-A of the module of FIG. 1A. FIG. 2 depicts a partial cross-sectional view of an alternative embodiment of a module including an integrated circuit of the module of the alternative embodiment. FIG. 3 depicts a partial representation of an image capturing device 100 with an embodiment of an imaging module including an integrated circuit 180. FIG. 4 depicts a partial representation of an alternative image capturing device 100 with components of an embodiment of an imaging module including an integrated circuit 180. Referring to FIGS. 1A to 4, the light source unit 160 is electrically connected to the main substrate 190 and has a laser unit 168 and a first optical module 165. The laser unit 168 is configured to emit light having output power of over 20 mW and the first optical module 165 is configured to transmit the emitted light of the light source unit 160 therethrough. In some embodiments, the laser unit 168 may be a near-infrared (NIR) lights source; however, the embodiments are not limited thereto. It is readily appreciated that one or more than one commonly known laser emitting sources, such as distributed feedback (DFB) lasers, distributed bragg reflector (DBR) lasers, Fabry-Perot laser or any combination of light-emitting diodes, etc., in combination with one or more than one commonly known non-infrared light sources may be implemented as the laser unit 168 by those having ordinary skill in the relevant art, and the embodiments are not limited thereto. As an example, the laser unit 168 may emit light with a wavelength range of between 700 nm to 1,000 nm having continuous wave (CW), pulse mode, or combinations thereof, for total emission times of between 0.1 milliseconds to 500 milliseconds; however, the embodiments are not limited thereto. The image sensor unit 140 is electrically connected to the main substrate 190 near to the light source unit 160 and has a second optical module 145 and an image sensor module 142. The second optical module 145 is configured to capture images therethrough. The image sensor module 142 is configured to generate image signals of the captured images. Images captured may comprise, for example, still images, video images, and/or frame-by-frame images. The data processing module 180 is electrically connected to the main substrate 190 near to the light source and image sensor units 160,140 and configured to generate liveness detection signals of the generated image signals of the captured images. As an example, in certain embodiments, the data processing module 180 comprises circuitry configured to execute instructions defined in an instruction set architecture implemented thereby, such as an ASIC. It is readily appreciated that the data processing module 180 may comprise other chips or circuitry or combinations thereof performing required tasks of the data processing module 180 commonly known to those of ordinary skill in the relevant art, and the embodiments are not limited thereto. The laser unit 168 comprises a substrate 161 having a lateral surface 167 and a first inclined surface 164a extending therefrom, a conductive layer 150 formed over the lateral and first inclined surfaces 167,164a, and a laser source 162. The laser source 162 is electrically connected to the conductive layer 150 formed over the lateral surface 167. The emitted light of the light source unit 160 through the first optical module 165 is reflected light from the conductive layer 150 formed over the first inclined surface 164a. In some embodiments, the laser unit 168 further comprises a housing 163 encompassing the substrate 161, conductive layer 150, and laser source 162.

In some embodiments, the image sensor module 142 comprises at least one of a complementary metal oxide semiconductor (CMOS) arrays, charged coupled device (CDD) arrays or photodiode (PD) arrays. The image sensor module 142 may have sensor arrays of between 2×2 and 999×999 units, may be monochrome or color, and the second optical module 145 may have an f-number (f/#) of greater than 3.

In the embodiments, the image sensor module 142 has a plurality of sensor module wiring 149 configured to electrically connect the image sensor module 142 to the main substrate 190. In the embodiments, the laser unit 168 has a plurality of laser unit wiring 169 configured to electrically connect the laser source 162 to the main substrate 190.

In certain embodiments, the main substrate 190 has a plurality of connectors 194 configured to connect electrical circuitry thereof to other circuits, components or elements. As an example, and not to be limiting, the main substrate 190 may be a flex print circuit board (Flex PCB) having a plurality of board to board connectors. It is readily appreciated that the main substrate 190 may be configured to connect electrical circuitry thereof to other circuits, components, or elements by other means commonly known to those of ordinary skill in the relevant art, such as QFN (Quad Flat No-lead) package pin(s), PCB gold fingers, etc., and the embodiments are not limited thereto. In certain embodiments, the main substrate 190 is not a flex print circuit board (Flex PCB) and has a plurality of solder bumps 196 configured to connect electrical circuitry thereof to other circuits, components or elements.

In some embodiments, the substrate 161 of the laser unit 168 comprises a second inclined surface 164b, extending from the lateral surface 167 opposite the first inclined surface 164a, wherein the first and second inclined surfaces 164a, 164b comprise rim surfaces 166 opposite the lateral surface 167. In certain embodiments, the rim surfaces 166 fully support the first optical module 165; however, the embodiments are not limited thereto. In certain embodiments, the rim surfaces 166 may partially or not support the first optical module 165. As long as the emitted light of the light source unit 160 through the first optical module 165 is reflected light from the conductive layer 150 formed over the first inclined surface 164a.

Figure 5:
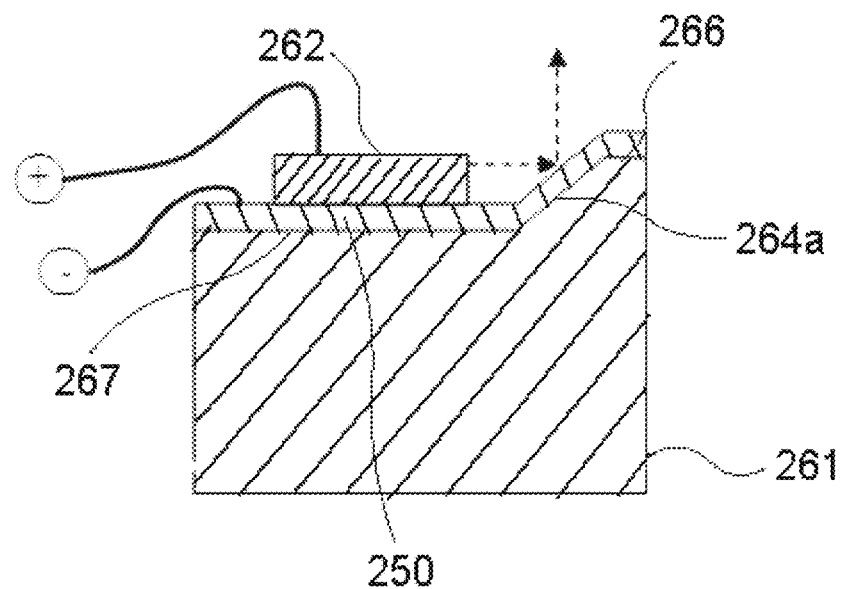
FIG. 5 depicts a partial cross-sectional view of a package structure of an embodiment of a laser of a light source unit.
Figure 6:
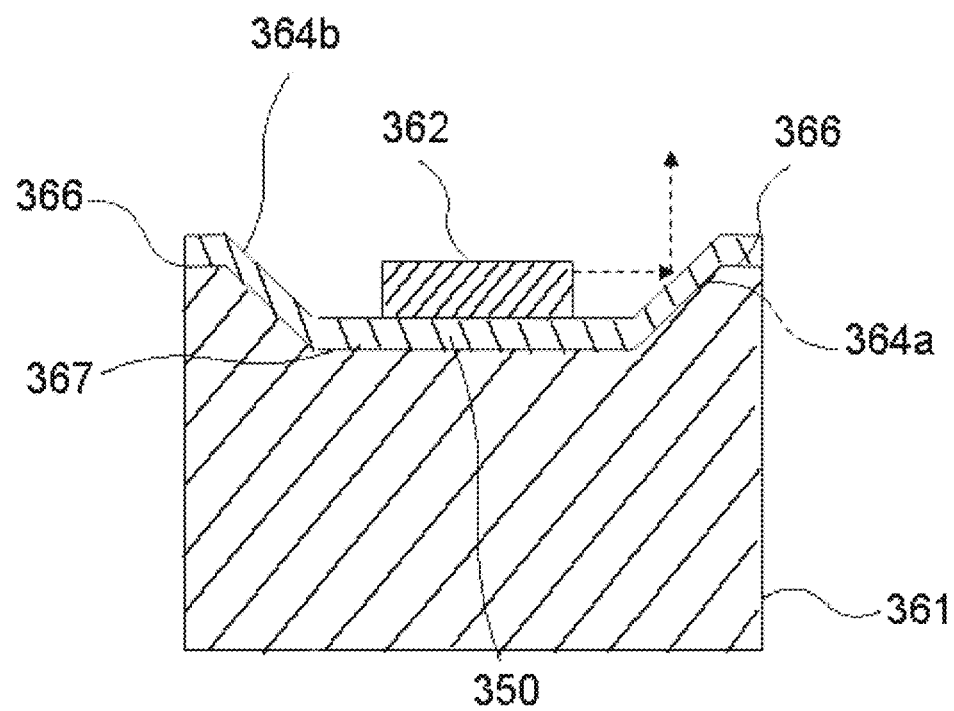
FIG. 6 depicts a partial cross-sectional view of a package structure of an alternative embodiment of a laser of a light source unit.
Figure 7:
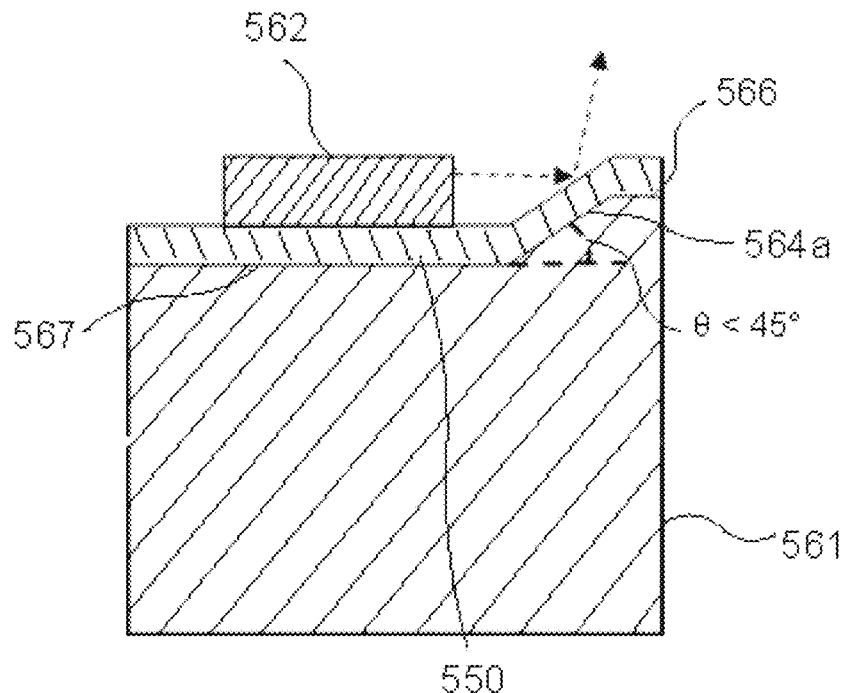
FIG. 7 depicts a partial cross-sectional view of a package structure of another alternative embodiment of a laser of a light source unit.
Figure 8:
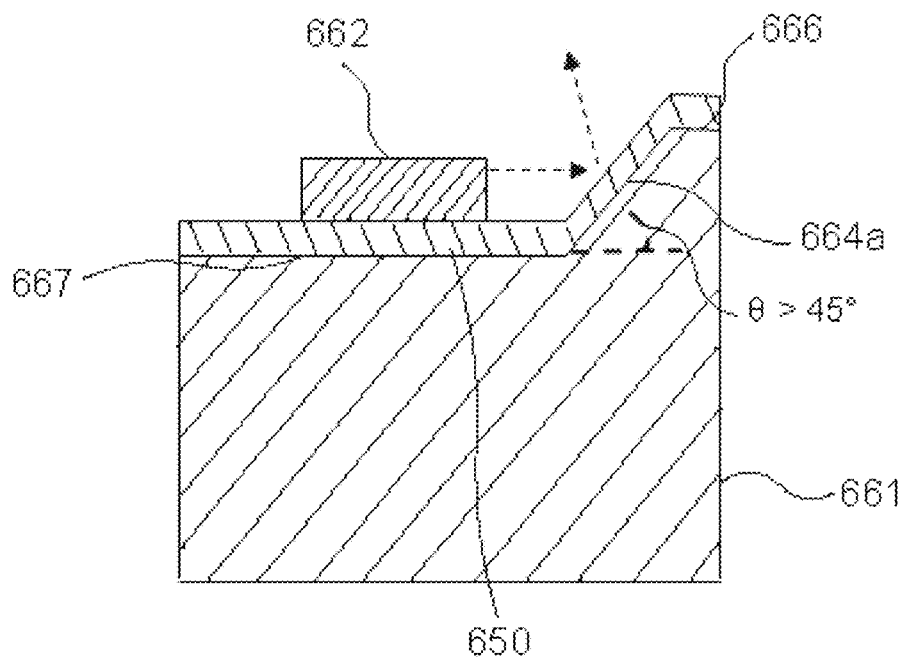
FIG. 8 depicts a partial cross-sectional view of a package structure of yet another alternative embodiment of a laser of a light source unit.

FIG. 5 depicts a partial cross-sectional view of a package structure of an embodiment of a laser of a light source unit. FIG. 6 depicts a partial cross-sectional view of a package structure of an alternative embodiment of a laser of a light source unit. FIG. 7 depicts a partial cross-sectional view of a package structure of another alternative embodiment of a laser of a light source unit. FIG. 8 depicts a partial cross-sectional view of a package structure of yet another alternative embodiment of a laser of a light source unit. Referring to FIGS. 5 to 8, and referring to FIGS. 1A to 4, in some embodiments partial cross-sectional views of package structures comprise substrates 261, 361, 561, 661, laser sources 262, 362, 562, 662, and conductive layers 250, 350, 550, 650, respectively. The laser units of the partial cross-sectional views of package structures further comprise lateral surfaces 267, 367, 567, 667 and first inclined surfaces 264a, 364a, 564a, 664a extending therefrom, respectively. In the alternative embodiment, the substrate 361 of the light source units further comprises a second inclined surface 364b, extending from the lateral surface 367 opposite the first inclined surface 364a. The first and second inclined surfaces 264a, 364a, 564a, 664a, and 364b, respectively, comprise rim surfaces 266, 366, 566, 666 opposite the lateral surface 267, 367, 567, 667.

In some embodiments, the inclined surfaces comprise internal angles θ from planes of the lateral surfaces 267, 367, 567, 667 to the first inclined surfaces 264a, 364a, 564a, 664a of between 25° to 75° degrees, inclusive, respectively. In the embodiment and alternative embodiment of the partial cross-sectional views of package structures, the internal angles θ from planes of the lateral surfaces 267, 367 to the first inclined surfaces 264a, 364a, respectively, are 45° degrees. In the another alternative embodiment of the partial cross-sectional view of the package structure, the internal angle θ from a plane of the lateral surface 567 to the first inclined surface 564a is less than 45° degrees. In the yet another alternative embodiment of the partial cross-sectional view of the package structure, the internal angle θ from a plane of the lateral surface 667 to the first inclined surface 664a is greater than 45° degrees. In certain embodiments, the different internal angles θ comprise different first inclined surface lengths; however, the embodiments are not limited thereto. In certain embodiments, the different internal angles θ comprise same first inclined surface lengths; as long as the emitted light of the light source unit through the first optical module is reflected light from the conductive layer formed over the first inclined surface.

The internal angle, provides design flexibility for the disposition of the emitted light of the light source unit through the first optical module of an image capturing system; also, a same emitted target area may be achieved via different dispositions of the light source unit within the image capturing system via variation of the internal angle and perpendicular sidewise tilt of the internal angle plane.

In some embodiments, the conductive layer 150 comprises at least one of Au, Ag, Cu, Ni, Ti, and W, or any combination of the foregoing, providing flexibility for conductivity and reflectivity of the conductive layer 150.

The conductive layer formed over the lateral and first inclined surfaces decrease absorption of the emitted light of the light source unit when being reflected therefrom. Additionally, the conductive layer provides heat conduction for the laser source electrically connected to the conductive layer and coupling of circuitry of the image capturing system to the laser source.

In some embodiments, the laser source 162 is an edge emitting laser source having a coherence length of less than 30 centimeters.

Figure 9:
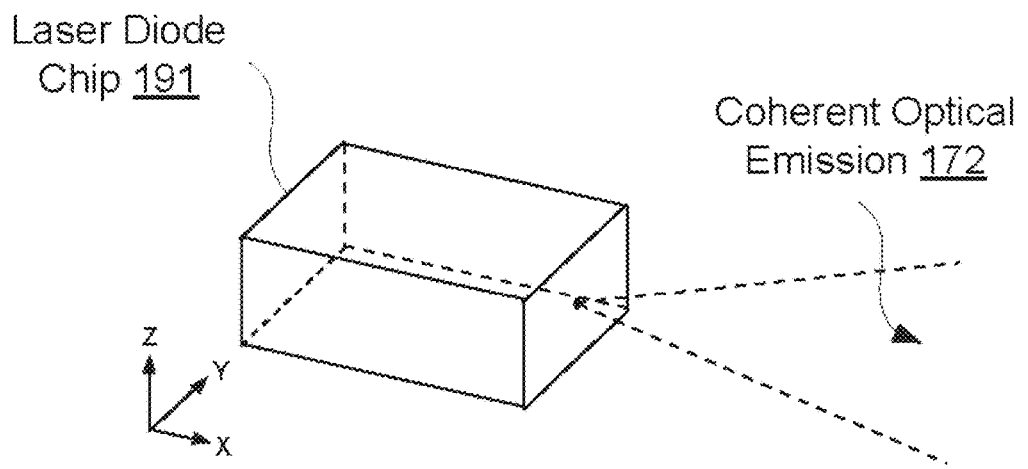
FIG. 9 depicts a representation of a laser of a light source unit emitting coherent light.
Figure 10:
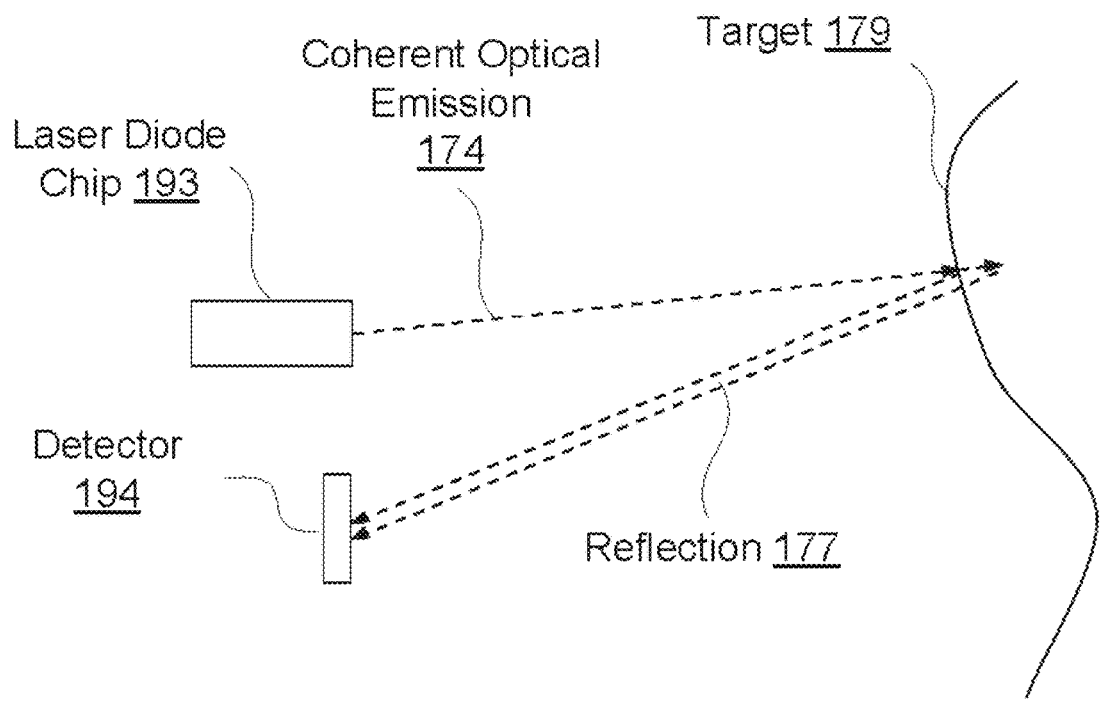
FIG. 10 depicts a representation of a laser of a light source unit emitting coherent light.
Figure 11:
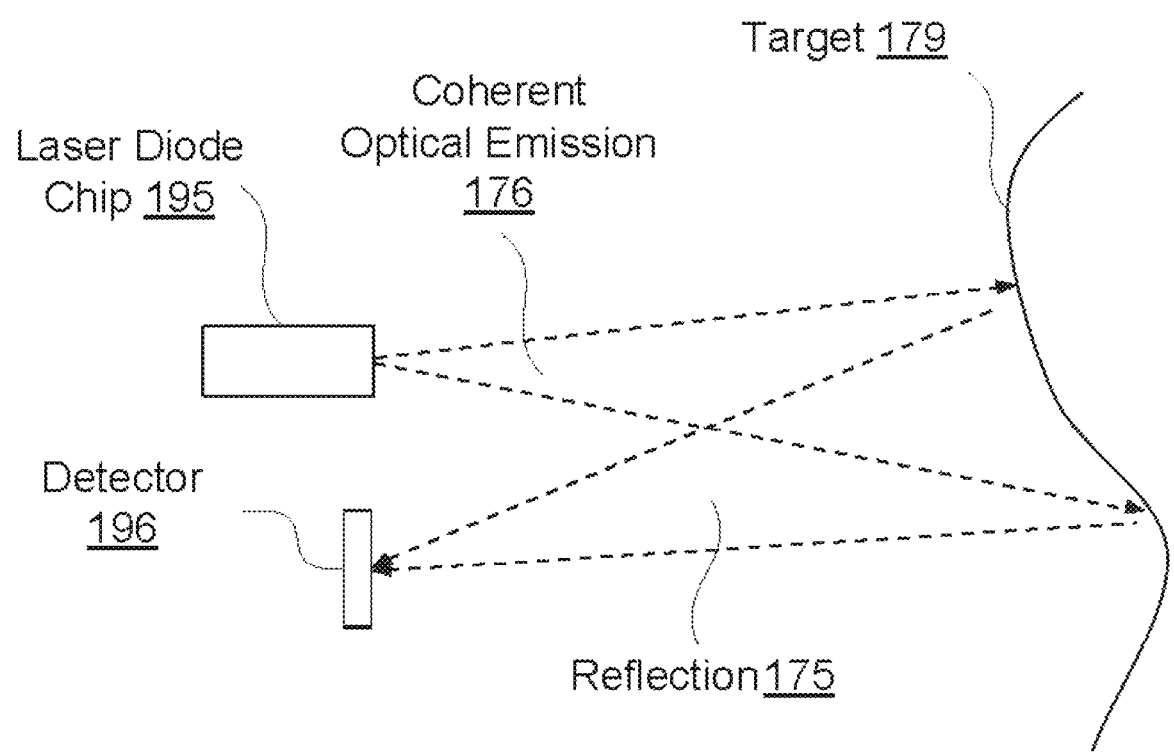
FIG. 11 depicts a representation of a laser of a light source unit emitting coherent light.
Figure 12B:
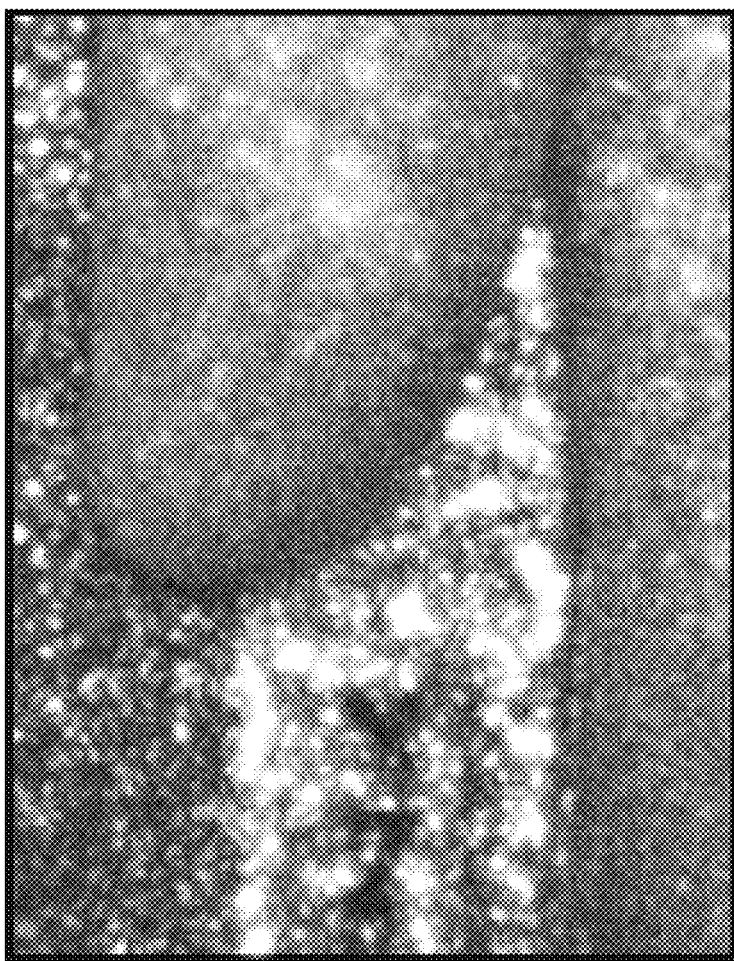
FIG. 12B depicts an enlarged view of the photograph of the embodiment of an index finger and thumb of the user's hand of FIG. 12A.
Figure 12A:
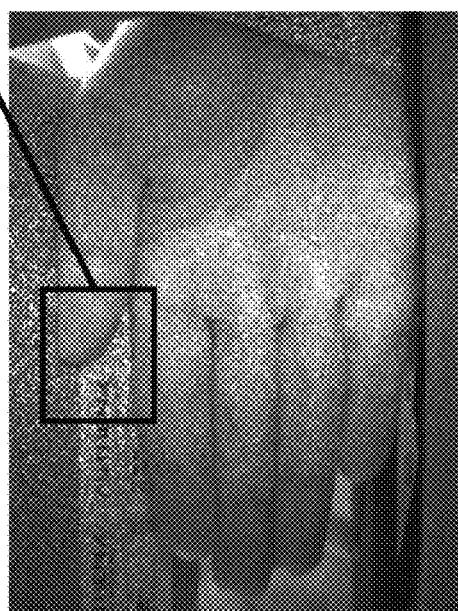
FIG. 12A depicts a photograph of an embodiment of features of a user's hand.

An edge emitting laser provides flexibility for high output power from a single emitter and longer coherence length. FIG. 9 depicts a representation of a laser of a light source unit emitting coherent light. FIG. 10 depicts a representation of a laser of a light source unit emitting coherent light. FIG. 11 depicts a representation of a laser of a light source unit emitting coherent light. Referring to FIGS. 9 to 11, and referring to FIGS. 1A to 8, lasers 191, 193, 195 of light source units may emit coherent light 172, 174, 176, reaching a target 179, whereby detectors 194, 196 may detect reflections 177, 175 of the target. Coherence is one unique property of laser radiation attributed to the light emission process. The coherent properties of light are described by temporal and spatial coherence. Temporal coherence is characterized by coherence length, Lcoh. Lcoh expresses the propagation distance over which coherence of a laser beam is kept. The spatial or lateral coherence of a laser beam describes a correlation between the phases of a light field in a lateral direction. The size of the spatial coherence, Lcoh, is associated with the divergence (φ) of the light beam at a point of irradiation. With light sources, the size of an emitted area may be larger than a light wavelength. Speckle, is a mottled pattern that arises when laser light falls on a non-specular reflecting surface. FIG. 12A depicts a photograph of an embodiment of features of a user's hand. FIG. 12B depicts an enlarged view of the photograph of the embodiment of an index finger and thumb of the user's hand of FIG. 12A. Referring to FIGS. 12A to 12B and referring to FIGS. 1A to 11, speckle patterns occur because of the interference of a large number of elementary waves.

High output power of an edge emitting laser provides greater contrast of liveness and ambient environment for liveness detection and feature recognition. The edge emitting laser, electrically connected to the conductive layer 150 formed over the lateral surface 167, together with the internal angle, decreases thickness required of the light source unit 160 of the image capturing system 130.

In the embodiments, the data processing module 180 is configured to generate each liveness detection signal from more than one image signal, in sequence, wherein each sequential image signal comprises a different image signal. In the embodiments, the data processing module 180 is configured to generate feature recognition data from more than one image signal, in sequence, wherein each sequential image signal comprises a different image signal. In certain embodiments, the different image signals may comprise of different depths (ΔL) in which the beam coherence is manifested.

Figure 13:
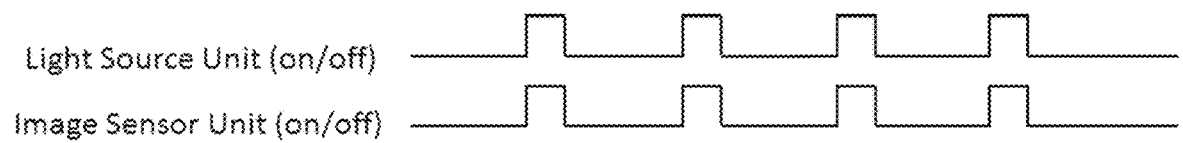
FIG. 13 depicts a timing diagram of an embodiment of light pulses.
Figure 14:
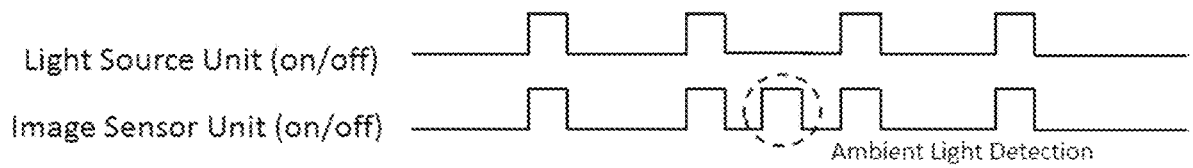
FIG. 14 depicts a timing diagram of an alternative embodiment of light pulses and ambient light detection.
Figure 15:
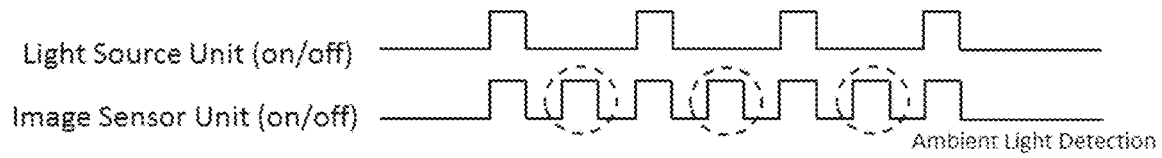
FIG. 15 depicts a timing diagram of another alternative embodiment of light pulses and ambient light detection.
Figure 16:
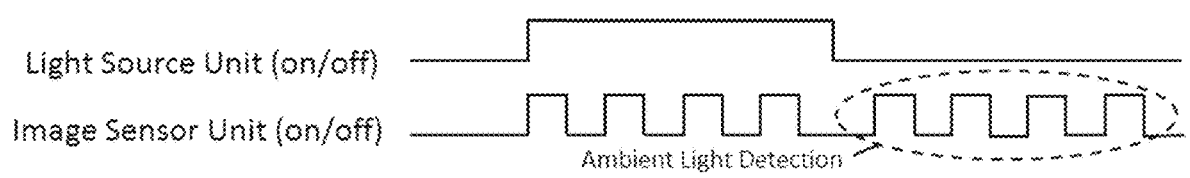
FIG. 16 depicts a timing diagram of yet another alternative embodiment of light pulses and ambient light detection.
Figure 17:
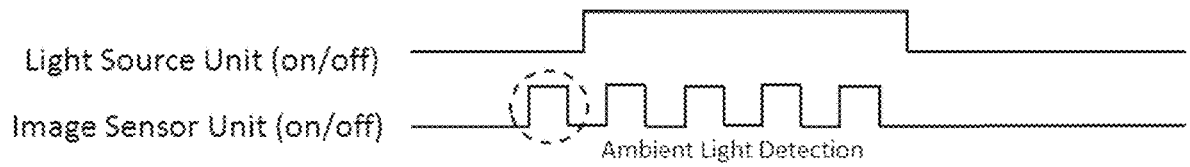
FIG. 17 depicts a timing diagram of another embodiment of light pulses and ambient light detection.

FIG. 13 depicts a timing diagram of an embodiment of light pulses. FIG. 14 depicts a timing diagram of an alternative embodiment of light pulses and ambient light detection. FIG. 15 depicts a timing diagram of another alternative embodiment of light pulses and ambient light detection. FIG. 16 depicts a timing diagram of yet another alternative embodiment of light pulses and ambient light detection. FIG. 17 depicts a timing diagram of another embodiment of light pulses and ambient light detection. Referring to FIGS.

13 to 17, and referring to FIGS. 1A to 12B, the generation of liveness detection data from each liveness detection signal of more than one image signal, in sequence, wherein each sequential image signal comprises a different image signal, increases the signal-to-noise ratio and reduces ambient light detection of the image capturing system 130 via adjusting of the on/off state of the laser source 162 and timing of the generation of image signals of the captured images, following processing of a predetermined amount of each liveness detection signal. Additionally, the generation of feature recognition data from more than one image signal, in sequence, wherein each sequential image signal comprises a different image signal, increases the signal-to-noise ratio and reduces ambient light detection of the image capturing system 130 via adjusting of the on/off state of the laser source 162 and timing of the generation of image signals of the captured images, following processing of a predetermined amount of each image signal. In certain embodiments, each image signal of the captured images are generated within 0.05 seconds, and the more than one sequential image signal, comprising different image signals are generated within 0.5 seconds; however, the embodiments are not limited thereto. Those of ordinary skill in the relevant art may readily appreciate that the generation of the captured images and more than one sequential image signals may be generated within more or less than 0.05 seconds and 0.5 seconds, respectively.

Figure 18:
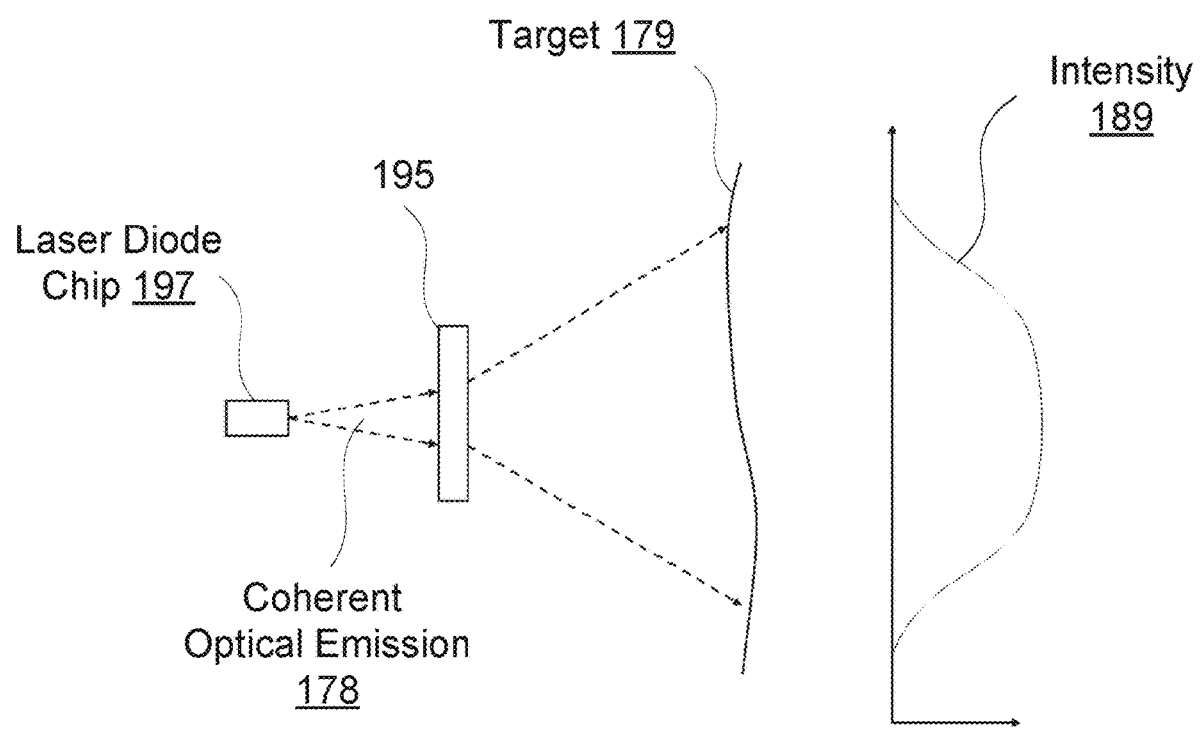
FIG. 18 depicts a representation of a laser of a light source unit emitting coherent light through a diffuser and lens(es).
Figure 19:
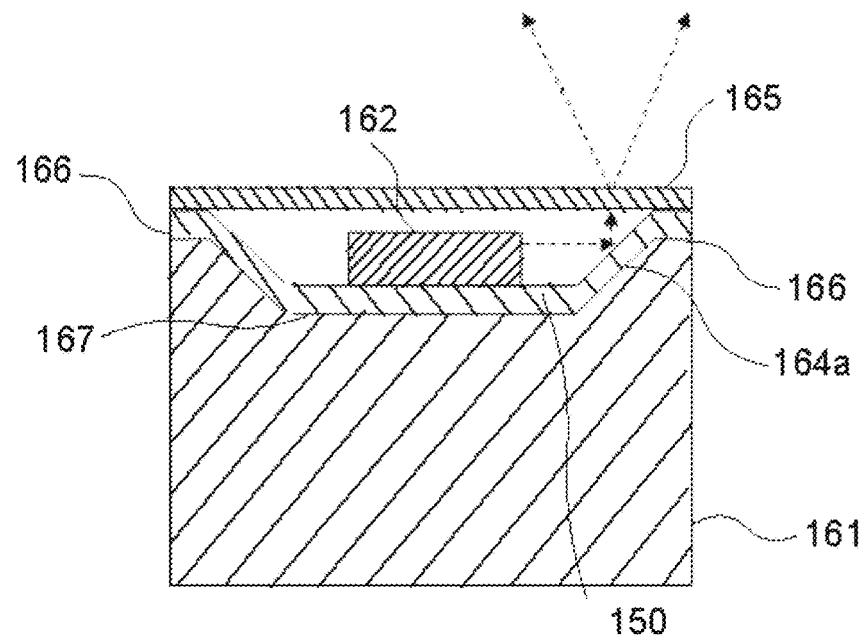
FIG. 19 depicts a partial cross-sectional view of a package structure of another alternative embodiment of a laser of a light source unit.

In some embodiments, the first optical module 165 comprises diffuser(s) and/or lens(es) configured to transmit the emitted light of the light source unit 160 therethrough; however, the embodiments are not limited thereto. It is readily appreciated that the first optical module 165 may comprise additional elements configured for different effects known by those of ordinary skill in the relevant art. As long as the emitted light of the light source unit 160 through the first optical module 165 is reflected light from the conductive layer 150 formed over the first inclined surface 164a. FIG. 18 depicts a representation of a laser of a light source unit emitting coherent light through a diffuser and lens(es). FIG. 19 depicts a partial cross-sectional view of a package structure of another alternative embodiment of a laser of a light source unit. Referring to FIGS. 18 to 19, and referring to FIGS. 1A to 17 in some embodiments, the first optical module 165 comprises diffuser(s) and/or lens(es) configured for far-field optics control, increasing the signal-to-noise ratio and reducing ambient light detection.

Figure 20:
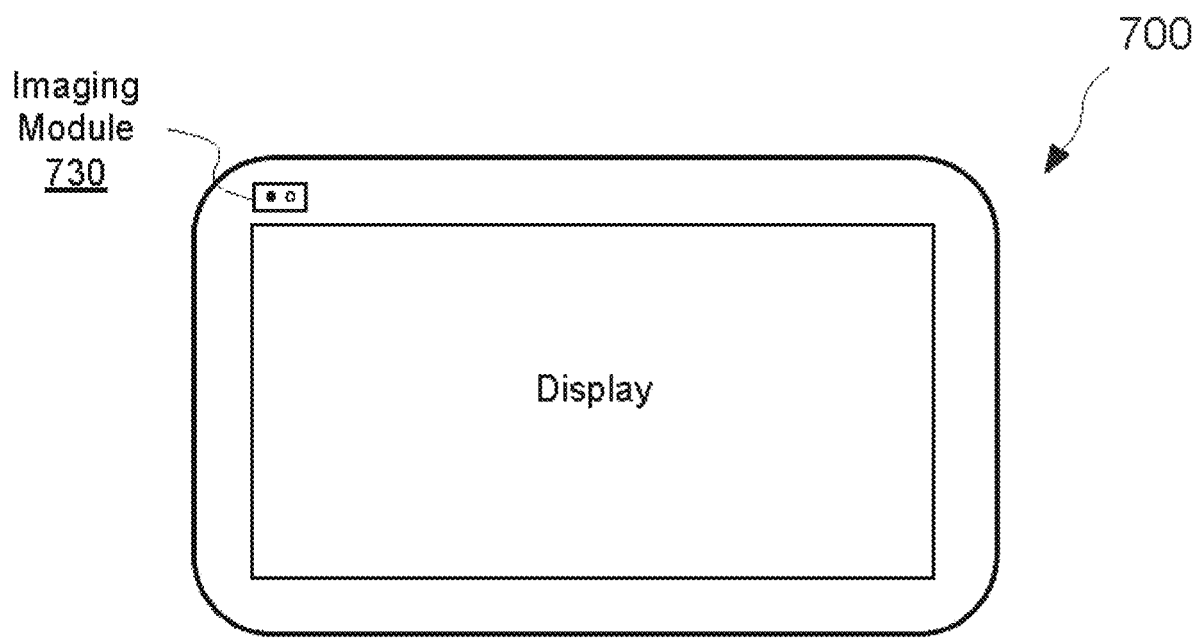
FIG. 20 depicts a representation of an image capturing device having an embodiment of a module including an integrated circuit.
Figure 21:
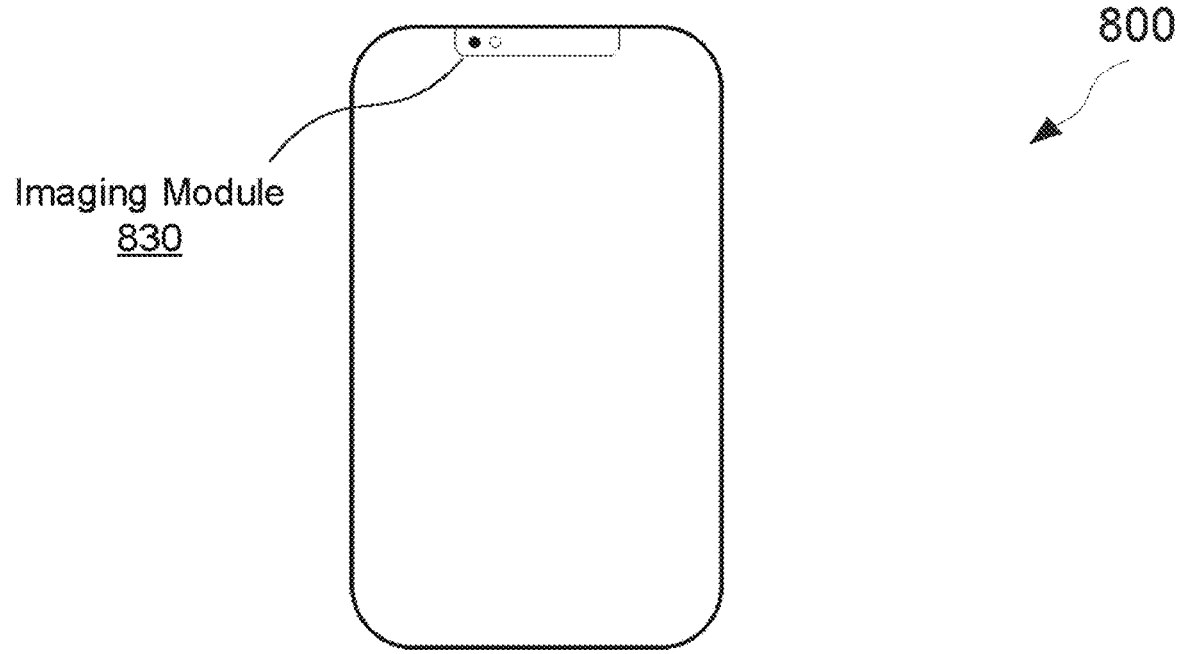
FIG. 21 depicts a representation of an alternative image capturing device having an embodiment of a module including an integrated circuit.

In an embodiment, an image capturing device, comprising an image capturing system and a display is provided. In some embodiments, the image capturing device may be a small or handheld computing device. In certain embodiments, the image capturing device may perform wireless communications using WLAN communication and/or RF communication capabilities (e.g., Wi-Fi, cellular, and/or Bluetooth). In certain embodiments, the image capturing device may be any device used by a user with a processor, memory, and display. In certain embodiments, the image capturing device may be coupled to a device or system, for example, via a terminal for the authentication process. The display may be, for example, an LCD screen, touchscreen or an indicator. In some embodiments, the display may comprise a user input interface (e.g., the display allows interactive input for the user). FIG. 20 depicts a representation of an image capturing device having an embodiment of a module including an integrated circuit. FIG. 21 depicts a representation of an alternative image capturing device having an embodiment of a module including an integrated circuit. Referring to FIGS. 20 to 21, and referring to FIGS. 1A to 19, the image capturing systems of the image capturing device 700, 800 comprises main substrates, light source units, image sensor units and data processing modules, respectively. The light source units are electrically connected to the main substrates, and have laser units and first optical modules, respectively. Each of the laser units are configured to emit light having output power of over 20 mW and the first optical modules are configured to transmit the emitted light of the light source units therethrough, respectively. The image sensor units are electrically connected to the main substrates near to the light source units and have second optical modules and image sensor modules, respectively. The second optical modules are configured to capture images therethrough. The image sensor modules are configured to generate image signals of the captured images. The data processing modules are electrically connected to the main substrates near to the light source and image sensor units and configured to generate liveness detection signals and feature recognition data of the generated image signals of the captured images, respectively. The light source units further comprise substrates having lateral surfaces and first inclined surfaces, conductive layers formed over the lateral and first inclined surfaces, and laser source, respectively. The laser sources are electrically connected to the conductive layers formed over the lateral surfaces, respectively. The emitted light of the light source units through the first optical modules are reflected light from the conductive layers formed over the first inclined surfaces, respectively.

Other features and principles of the image capturing device are generally the same as and described in detail in the embodiments of the image capturing system above, and for sake of brevity, will not repeated hereafter.

Figure 22:
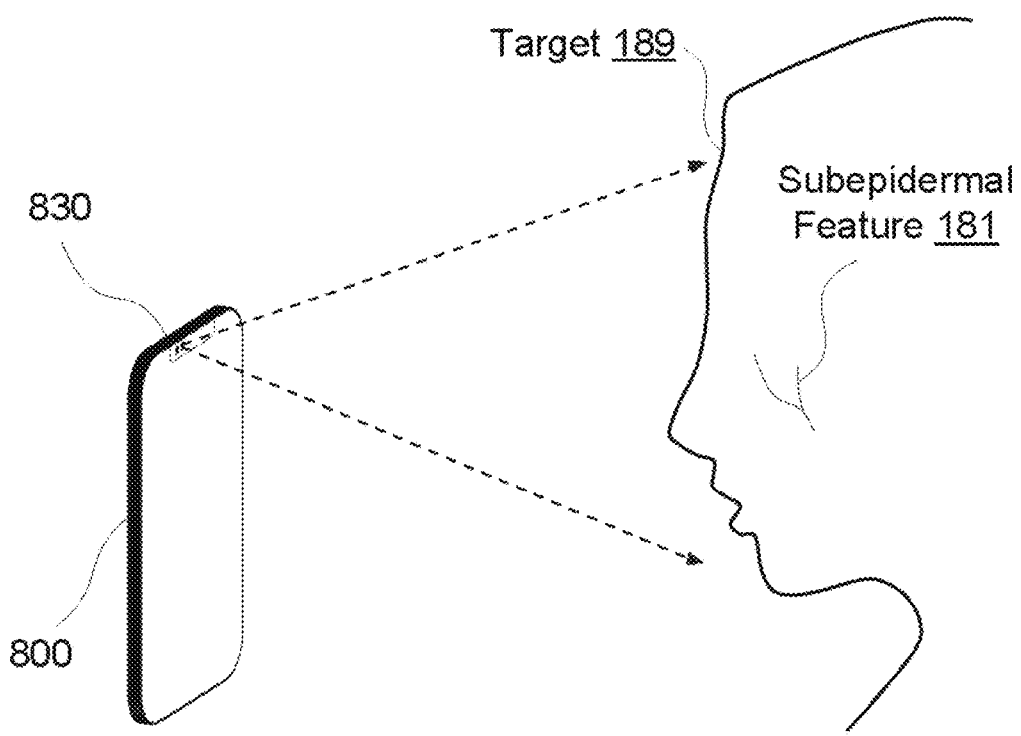
FIG. 22 depicts a representation of an embodiment of an image of a subepidermal feature in a user's face.
Figure 23:
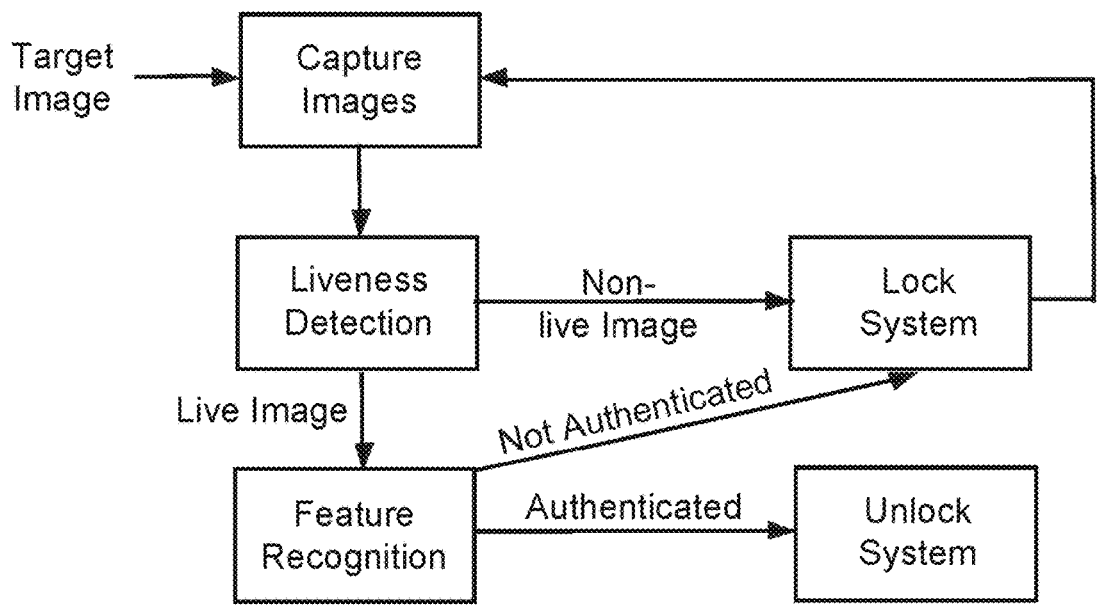
FIG. 23 depicts a flowchart of an embodiment of liveness recognition authentication process.
Figure 24:
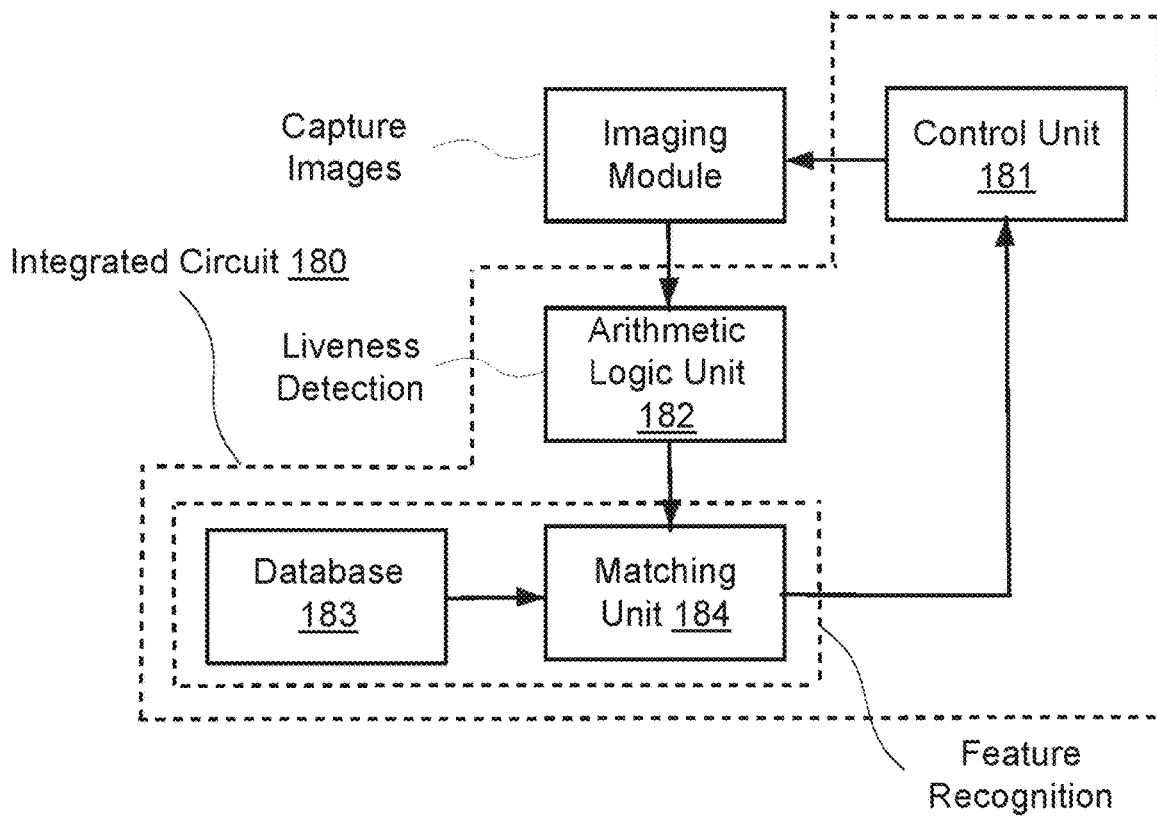
FIG. 24 depicts a flowchart of an embodiment of components of a liveness recognition authentication process.

In an embodiment, a method for capturing images via an image capturing device, comprising capturing and generating image signals, generating liveness detection signals of the image signals, generating liveness detection data and a liveness score, and determining whether the liveness score is above a liveness threshold for authenticating a user or locking the image capturing device is provided. FIG. 22 depicts a representation of an embodiment of an image of a subepidermal feature 181 in a user's face. FIG. 23 depicts a flowchart of an embodiment of liveness recognition authentication process. FIG. 24 depicts a flowchart of an embodiment of components of a liveness recognition authentication process. Referring to FIGS. 22 to 24, and referring to FIGS. 1A to 21, the method for capturing images comprises emitting, via a light source unit 160, light having output power of over 20 mW through a first optical path to an image, and capturing, via an image sensor unit 140, image signals through a second optical path to an image sensor module 142. It is indicated that the captured images of the image sensor unit 140 are to be generated via the image capturing device. As an example, indication may be via an LED light and/or text on a display; however, the embodiments are not limited thereto. Image signals of the captured images are generated, via an image sensor module 142 of the image sensor unit 140. The image signals of the captured images are processed, via a data processing module 180, and liveness detection signals are generated. The liveness detection signals are processed, via the data processing module 180, and liveness detection data is generated. A liveness score by comparing the liveness detection data against a database is generated. Whether the liveness score is above a liveness threshold is determined, via the data processing module 180. If yes, a user is authenticated to use the image capturing device or the image signals are further processed. If no, the image capturing device is locked.

It is readily appreciated that other steps and tasks may be added to the method for capturing images via an image capturing device, and the embodiments are not limited thereto. As an example, before emitting, via a light source unit 160, light having output power of over 20 mW through a first optical path to an image, an application may trigger an authentication process, indicated on a display or indicator, for positioning of one or more predetermined liveness areas for the capturing of images by the image sensor unit 140, and the embodiments are not limited thereto. As another example, multiple or various elements and accompanying methods and/or methods commonly known to those of ordinary skill in the relevant art may be added. As an example, some authentication sensing methods comprise dot-projectors, time-of-flight (ToF) sensors, 2D surfacing imaging, and 3D depth sensing etc.

A laser unit 168 of the light source unit 160 of the image capturing device of the method for capturing images emits light having output power of over 20 mW through a first optical path to the image. The laser unit 168 of the image capturing device of the method for capturing images comprises a substrate 161 having a lateral surface 167 and a first inclined surface 164*a*, a conductive layer 150 formed over the lateral and first inclined surfaces 167, 164*a*, and a laser source 162. The emitted light through the first optical path to the image is reflected light from the conductive layer 150 formed over the first inclined surface 164*a*.

In some embodiments of the method for capturing images, the image sensor module 142 comprises at least one of a complementary metal oxide semiconductor (CMOS) arrays, charged coupled device (CDD) arrays or photodiode (PD) arrays.

In some embodiments of the method for capturing images, the first inclined surface 164*a* comprises an internal angle θ from planes of the lateral surface 167 to the first inclined surface 164*a* of between 25° to 75° degrees, inclusive.

In certain embodiments, the different internal angles θ comprise different first inclined surface lengths; however, the embodiments are not limited thereto. In certain embodiments, the different internal angles θ comprise same first inclined surface lengths; as long as long as the emitted light of the light source unit through the first optical module is reflected light from the conductive layer formed over the first inclined surface.

The internal angle, provides design flexibility for the disposition of the emitted light of the light source unit through the first optical module of an image capturing system; as, a same emitted target area may be achieved via different dispositions of the light source unit within the image capturing system via variation of the internal angle and perpendicular sidewise tilt of the internal angle plane.

In some embodiments of the method for capturing images, the conductive layer 150 of the image capturing system 130 of the image capturing device, comprises at least one of Au, Ag, Cu, Ni, Ti, and W, or any combination of the foregoing.

The conductive layer formed over the lateral and first inclined surfaces decrease absorption of the emitted light of the light source unit when being reflected therefrom. Additionally, the conductive layer provides heat conduction for the laser source electrically connected to the conductive layer and coupling of circuitry of the image capturing system to the laser source.

In some embodiments of the method for capturing images, generating liveness detection signals comprises generating each liveness detection signal from more than one image signal, in sequence, wherein each sequential image signal comprises a different image signal. As an example, each liveness detection signal may be the result of the extraction of vessel features and blood flow signals; however, the embodiments are not limited thereto. Each liveness detection signal may be the result of the extraction of retina features, palm print features, or fingerprint features etc.

In some embodiments of the method for capturing images, the method, further comprises generating feature recognition data and a matching score, and determining whether the matching score is above an unlock threshold for authenticating a user or locking the image capturing device, following, processing the image signals when determining whether the liveness score is above a liveness threshold, if yes. Feature recognition data is generated and a matching score by comparing the feature recognition data against a database is generated via the data processing module 180. The matching score is compared to a unlock threshold of the image capturing device via the data processing module 180. Whether the matching score is above an unlock threshold is determined. If yes, a user is authenticated to use the image capturing device. If no, the image capturing device is locked.

In certain embodiments of the method for capturing images, generating feature recognition data of the method for capturing images comprises generating feature recognition data from more than one image signal, in sequence, wherein each sequential image signal comprises a different image signal.

In some embodiments of the method for capturing images, the laser source 162 is an edge emitting laser source having a coherence length of less than 30 centimeters.

An edge emitting laser provides flexibility for high output power from a single emitter and longer coherence length. A laser 191 of a light source unit may emit coherent light 172, reaching a target 179, whereby a detector 194 may detect reflections 177 of the target.

Figure 25A:
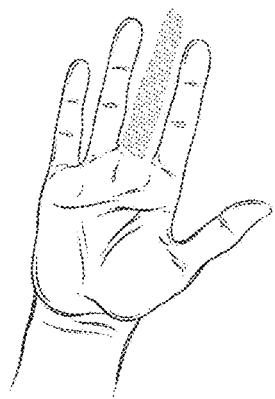
FIG. 25A depicts a representation of an embodiment of an image of features of a user's hand having infrared blocking material wrapped around a middle finger.
Figure 25B:
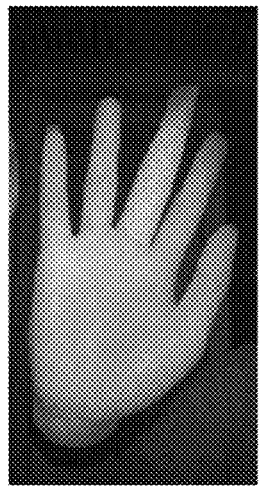
FIG. 25B depicts a photograph of the embodiment of features of the user's hand having infrared blocking material wrapped around a middle finger of FIG. 25A.
Figure 25C:
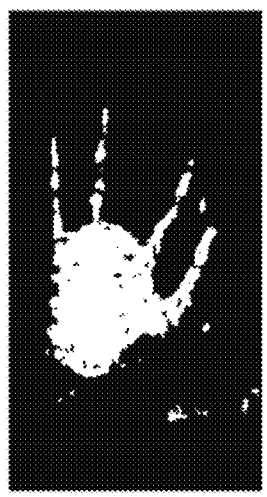
FIG. 25C depicts a photograph of the embodiment of liveness signals of the user's hand having blocking material wrapped around a middle finger of FIG. 25A.
Figure 26A:
FIG. 26A depicts a photograph of an embodiment of features of a user's face.
Figure 26B:
FIG. 26B depicts a photograph of the embodiment of liveness signals of the user's face of FIG. 26A.
Figure 26C:
FIG. 26C depicts a photograph of the embodiment of subepidermal features of the user's face of FIG. 26A.

High output power of an edge emitting laser provides greater contrast of liveness and ambient environment for liveness detection and feature recognition. FIG. 25A depicts a representation of an embodiment of an image of features of a user's hand having infrared blocking material wrapped around a middle finger. FIG. 25B depicts a photograph of the embodiment of features of the user's hand having infrared blocking material wrapped around a middle finger of FIG. 25A. FIG. 25C depicts a photograph of the embodiment of liveness signals of the user's hand having blocking material wrapped around a middle finger of FIG. 25A. FIG. 26A depicts a photograph of an embodiment of features of a user's face. FIG. 26B depicts a photograph of the embodiment of liveness signals of the user's face of FIG. 26A. FIG. 26C depicts a photograph of the embodiment of subepidermal features of the user's face of FIG. 26A. Referring to FIGS. 25A to 26C, and referring to FIGS. 1A to 24, the generation of liveness detection data from each liveness detection signal of more than one image signal, in sequence, wherein each sequential image signal comprises a different image signal, increases the signal-to-noise ratio and reduces ambient light detection of the image capturing system 130 via adjusting of the on/off state of the laser source 162 and timing of the generation of image signals of the captured images, following processing of a predetermined amount of each liveness detection signal. Additionally, the generation of feature recognition data from more than one image signal, in sequence, wherein each sequential image signal comprises a different image signal, increases the signal-to-noise ratio and reduces ambient light detection of the image capturing system 130 via adjusting of the on/off state of the laser source 162 and timing of the generation of image signals of the captured images, following processing of a predetermined amount of each image signal.

The edge emitting laser, electrically connected to the conductive layer 150 formed over the lateral surface 167, together with the internal angle, decreases thickness required of the light source unit 160 of the image capturing system 130.

Other features and principles of the method for capturing images via an image capturing device are generally the same as and described in detail in the embodiments of the image capturing system above, and for sake of brevity, will not repeated hereafter.

Biometrics uses an individual's unique biological identifiers to verify his or her identity. However, biometric authentication is susceptible to "presentation attacks" such as spoofing, that attempts to defeat a biometric verification or identification process.

Liveness detection is any technique used to detect a spoof attempt by determining whether the source of a biometric sample is a live human being or a fake representation. This is accomplished through algorithms that analyze data collected from biometric sensors to determine whether the source is live or reproduced.

For passive liveness detection, algorithms are used to detect indicators of a non-live image without user interaction. The capture of high-quality biometric data during registration improves the performance of matching and liveness detection algorithms. Nevertheless, "presentation attacks" such as spoofing continue to be a challenge for biometric authentication.

A liveness detection device comprising a light source unit, image sensor unit, and data processing module and authentication method thereof are provided. The light source unit comprises a substrate having a first inclined surface, whereby emitted light is reflected light from the first inclined surface. An application triggers an authentication process, which is indicated to a user. The light source unit begins illumination having a specific pattern and for a specific period and image signals are generated. Liveness detection signals are generated, via calculation of interference patterns, each, from more than one image signal, in sequence, for determination of liveness. When a liveness threshold is met, feature recognition data is generated, via calculation of interference patterns, each, from more than one image signal, in sequence, for matching. Then, the features are compared with previously enrolled data for locking or unlocking of the liveness detection device and/or system coupled thereto.

In the embodiments, the internal angle, provides design flexibility for the disposition of the emitted light of the light source unit through the first optical module of an image capturing system; as, a same emitted target area may be achieved via different dispositions of the light source unit within the image capturing system via variation of the internal angle and perpendicular sidewise tilt of the internal angle plane. The edge emitting laser provides flexibility for high output power from a single emitter and longer coherence length. High output power provides greater contrast of liveness and ambient environment for liveness detection and feature recognition. The edge emitting laser, electrically connected to the conductive layer formed over the lateral surface, together with the internal angle, decreases thickness required of the light source unit of the image capturing system. The generation of liveness detection data from each liveness detection signal of more than one image signal, in sequence, wherein each sequential image signal comprises a different image signal, increases the signal-to-noise ratio and reduces ambient light detection of the image capturing system via adjusting of the on/off state of the laser source and timing of the generation of image signals of the captured images, following processing of a predetermined amount of each liveness detection signal. The generation of feature recognition data from more than one image signal, in sequence, wherein each sequential image signal comprises a different image signal, increases the signal-to-noise ratio and reduces ambient light detection of the image capturing system via adjusting of the on/off state of the laser source and timing of the generation of image signals of the captured images, following processing of a predetermined amount of each image signal.

Also in the embodiments, the conductive layer formed over the lateral and first inclined surfaces, decreases absorption of the emitted light of the light source unit when being reflected therefrom. Additionally, the conductive layer provides heat conduction for the laser source electrically connected to the conductive layer and coupling of circuitry of the image capturing system to the laser source. The conductive layer comprising at least one of Au, Ag, Cu, Ni, Ti, and W, or any combination of the foregoing, provides flexibility for conductivity and reflectivity of the conductive layer.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. A sequence of operations does not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

Given the many possible embodiments to which the disclosed principles may be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. An image capturing system, comprising:
   a main substrate;
   a light source unit electrically connected to the main substrate, having a laser unit and a first optical module, the laser unit configured to emit light having output power of over 20 mW, the first optical module configured to transmit the emitted light of the light source unit therethrough;
   an image sensor unit electrically connected to the main substrate near to the light source unit, having a second optical module and an image sensor module, the second optical module configured to capture images therethrough, the image sensor module configured to generate image signals of the captured images; and
   a data processing module electrically connected to the main substrate near to the light source and image sensor units, configured to generate liveness detection signals of the generated image signals of the captured images,
   wherein the laser unit comprises a substrate having a lateral surface and a first inclined surface, a conductive layer formed over the lateral and first inclined surfaces, and a laser source, whereby the laser source is electrically connected to the conductive layer formed over the lateral surface, and the emitted light of the light source unit through the first optical module is reflected light from the conductive layer formed over the first inclined surface, and
   wherein the data processing module is configured to generate each liveness detection signal from more than one image signal, in sequence, wherein each sequential image signal comprises a different image signal.

2. The image capturing system of claim 1, wherein the first inclined surface comprises an internal angle θ from a plane of the lateral surface to the first inclined surface of between 25° to 75° degrees, inclusive.

3. The image capturing system of claim 1, wherein the laser unit comprises at least one of a distributed feedback (DFB) laser, distributed bragg reflector (DBR) laser, Fabry-Perot laser, or light-emitting diode, or any combination of the foregoing.

4. The image capturing system of claim 1, wherein the data processing module is further configured to generate feature recognition data of the generated image signals of the captured images.

5. The image capturing system of claim 4, wherein the data processing module is further configured to generate feature recognition data from more than one image signal, in sequence, wherein each sequential image signal comprises a different image signal.

6. The image capturing system of claim 1, wherein the laser unit is an edge emitting laser unit having a coherence length of less than 30 centimeters.

7. The image capturing system of claim 1, wherein the image sensor module comprises at least one of a complementary metal oxide semiconductor (CMOS) arrays, charged coupled device (CDD) arrays or photodiode (PD) arrays.

8. An image capturing device, comprising:
   an image capturing system, comprising:
      a main substrate;
      a light source unit electrically connected to the main substrate, having a laser unit and a first optical module, the laser unit configured to emit light having output power of over 20 mW, the first optical module configured to transmit the emitted light of the light source unit therethrough;
      an image sensor unit electrically connected to the main substrate near to the light source unit, having a second optical module and an image sensor module, the second optical module configured to capture images therethrough, the image sensor module configured to generate image signals of the captured images; and
      a data processing module electrically connected to the main substrate near to the light source and image sensor units, configured to generate liveness detection signals of the generated image signals of the captured images,
      wherein the laser unit comprises a substrate having a lateral surface and a first inclined surface, a conductive layer formed over the lateral and first inclined surfaces, and a laser source, whereby the laser source is electrically connected to the conductive layer formed over the lateral surface, and the emitted light of the light source unit through the first optical module is reflected light from the conductive layer formed over the first inclined surface, and
      wherein the data processing module is configured to generate each liveness detection signal from more than one image signal, in sequence, wherein each sequential image signal comprises a different image signal; and
   a display device coupled to the image capturing system, configured to display the captured images of the image sensor unit.

9. The image capturing device of claim 8, wherein the first inclined surface comprises an internal angle θ from a plane of the lateral surface to the first inclined surface of between 25° to 75° degrees, inclusive.

10. The image capturing device of claim 8, wherein the laser unit comprises at least one of a distributed feedback (DFB) laser, distributed bragg reflector (DBR) laser, Fabry-Perot laser, or light-emitting diode, or any combination of the foregoing.

11. The image capturing device of claim 8, wherein the data processing module is further configured to generate feature recognition data of the generated image signals of the captured images.

12. The image capturing device of claim 11, wherein the data processing module is configured to generate feature recognition data from more than one image signal, in sequence, wherein each sequential image signal comprises a different image signal.

13. The image capturing device of claim 8, wherein the laser unit is an edge emitting laser unit having a coherence length of less than 30 centimeters.

14. The image capturing device of claim 8, wherein the image sensor module comprises at least one of a complementary metal oxide semiconductor (CMOS) arrays, charged coupled device (CDD) arrays or photodiode (PD) arrays.

15. A method for capturing images via an image capturing device, comprising:
   emitting, via a light source unit, light having output power of over 20 mW through a first optical path to an image;
   capturing, via an image sensor unit, image signals through a second optical path to an image sensor module;

indicating, via the image capturing device, that the captured images of the image sensor unit is to be generated;

generating, via an image sensor module of the image sensor unit, image signals of the captured images;

processing, via a data processing module, the image signals of the captured images and generating liveness detection signals;

processing, via the data processing module, the liveness detection signals and generating liveness detection data;

generating, via the data processing module, a liveness score by comparing the liveness detection data against a database; and determining, via the data processing module, whether the liveness score is above a liveness threshold, if yes, authenticating a user to use the image capturing device or further processing the image signals, if no, locking the image capturing device, wherein a laser unit of the light source unit emits light having output power of over 20 mW through the first optical path to the image, and wherein an image sensor module of the image sensor unit generates image signals of the captured images, and wherein the laser unit comprises a substrate having a lateral surface and a first inclined surface, a conductive layer formed over the lateral and first inclined surfaces, and a laser source, whereby the emitted light through the first optical path to the image is reflected light from the conductive layer formed over the first inclined surface, and wherein generating liveness detection signals comprises generating each liveness detection signal from more than one image signal, in sequence, wherein each sequential image signal comprises a different image signal.

16. The method for capturing images of claim 15, wherein the first inclined surface comprises an internal angle θ from a plane of the lateral surface to the first inclined surface of between 25° to 75° degrees, inclusive.

17. The method for capturing images of claim 15, wherein the laser unit comprises at least one of a distributed feedback (DFB) laser, distributed bragg reflector (DBR) laser, Fabry-Perot laser, or light-emitting diode, or any combination of the foregoing.

18. The method for capturing images of claim 15, wherein further processing the image signals when determining whether the liveness score is above a liveness threshold, if yes, of the method, further comprises:

generating, via the data processing module, feature recognition data, generating, via the data processing module, a matching score by comparing the feature recognition data against a database;

comparing, via the data processing module, the matching score to a unlock threshold of the image capturing device; and determining, via the data processing module, whether the matching score is above an unlock threshold, if yes, authenticating a user to use the image capturing device, if no, locking the image capturing device, wherein, generating feature recognition data comprises generating feature recognition data from more than one image signal, in sequence, wherein each sequential image signal comprises a different image signal.

19. The method for capturing images of claim 15, wherein the laser unit is an edge emitting laser unit having a coherence length of less than 30 centimeters.

20. The method for capturing images of claim 15, wherein the image sensor module comprises at least one of a complementary metal oxide semiconductor (CMOS) arrays, charged coupled device (CDD) arrays or photodiode (PD) arrays.

* * * * *